United States Patent [19]
Singbartl

[11] Patent Number: 5,967,473
[45] Date of Patent: Oct. 19, 1999

[54] ADJUSTABLE MOUNTING ASSEMBLY FOR A SENSOR

[75] Inventor: Günther Singbartl, Hannover, Germany

[73] Assignee: WABCO GmbH, Hannover, Germany

[21] Appl. No.: 08/933,793

[22] Filed: Sep. 19, 1997

[30] Foreign Application Priority Data

Sep. 24, 1996 [DE] Germany ............... 196 39 075

[51] Int. Cl.$^6$ ...................... G01P 3/48
[52] U.S. Cl. ............ 248/200; 248/300; 324/173
[58] Field of Search ............... 248/300, 200; 384/448; 324/173

[56] References Cited

U.S. PATENT DOCUMENTS

| | | | |
|---|---|---|---|
| 1,929,574 | 10/1933 | Armstrong | 248/300 |
| 2,754,155 | 5/1956 | Collins | 248/300 X |
| 2,795,834 | 6/1957 | Szoke | 248/300 X |
| 2,802,634 | 8/1957 | Everett | 248/300 |
| 3,825,214 | 7/1974 | Ciolfi | 248/300 |
| 4,658,168 | 4/1987 | Belart et al. | 324/173 X |
| 5,122,740 | 6/1992 | Cottam et al. | 324/173 |
| 5,640,087 | 6/1997 | Alff | 384/448 X |
| 5,650,720 | 7/1997 | Brockmuller et al. | 324/173 |

FOREIGN PATENT DOCUMENTS

| | | |
|---|---|---|
| 0 521 693 B1 | 1/1993 | European Pat. Off. . |
| GM 18 09 958 | 2/1960 | Germany . |
| 19 42 657 | 9/1970 | Germany . |
| GM 73 42 182 | 3/1974 | Germany . |
| 26 21 037 C2 | 11/1976 | Germany . |
| 32 29 207 C2 | 4/1984 | Germany . |
| 40 33 064 A1 | 4/1992 | Germany . |
| 43 12 062 A1 | 10/1994 | Germany . |
| 44 39 797 A1 | 5/1996 | Germany . |
| 08 029 205 | 2/1996 | Japan . |

Primary Examiner—Derek J. Berger
Attorney, Agent, or Firm—Proskauer Rose LLP

[57] ABSTRACT

A mounting assembly for adjustably attaching a first component, such as a wheel speed sensor, to a second component, such as a part of a wheel suspension, comprises a mounting device having first and second regions, and an intermediate region located between the first and second regions, the first component being mounted on the first region of the mounting device, and an attachment element, such as a screw, which connects the second region of the mounting device to the second component. The mounting device is shaped so that its intermediate region is spaced away from the second component. Upon tightening of the attachment element, the intermediate region of the mounting device is brought into contact with the second component by elastic or plastic deformation of the mounting device, whereby the position of the first component is fixed in relation to the second component.

17 Claims, 3 Drawing Sheets

ADJUSTABLE MOUNTING ASSEMBLY FOR A SENSOR

BACKGROUND OF THE INVENTION

The present invention relates to an adjustable mounting assembly whereby a first component, such as a wheel speed sensor, is adjustably fixed to a second component, such as the wheel suspension of a vehicle.

An arrangement of this type is known from EP 0 521 693 B1(U.S. Pat. No. 5,085,519). In this known arrangement, a sensor in the form of an inductive wheel speed sensor for an ABS anti-lock braking system is mounted opposite a toothed exciter wheel for the production of pulses. The sensor/toothed wheel arrangement is attached to the wheel suspension of a vehicle by means of a flange and screw arrangement. The flange and the sensor are intimately connected to each other, either by being constructed as a single unit or by being held together by welding.

In the arrangement described above, the sensor is desirably attached to the toothed wheel at a precisely defined location so that a fixed distance between the toothed wheel and the sensor is maintained. However, the precision of positioning during assembly of the sensor depends to a great extent on the manufacturing tolerances of the flange used to attach the sensor to the wheel suspension of the vehicle. Depending on the manner in which the flange is made, e.g., by deep-drawing, it may be deformed and therefore have a very wide manufacturer's tolerance. It is noted that maintaining very small tolerances in making the flange involves high production costs.

The object of the present invention is to provide an arrangement for adjustably attaching a first component, such as a sensor, to a second component, such as a wheel suspension, using a mostly tolerance-independent mounting assembly which is simple and inexpensive to produce. The simplicity of the mounting device makes it easy to assemble the arrangement described above.

SUMMARY OF THE INVENTION

The object of the invention is attained in a mounting assembly for adjustably attaching a first component, such as a wheel speed sensor, to a second component, such as a part of the wheel suspension, comprising a mounting device having a first region, a second region, and an intermediate region located between the first and second regions, the first component being mounted on the first region of the mounting device, and an attachment element, such as a screw, which connects the second region of the mounting device to the second component. The mounting device is shaped so that its intermediate region is spaced away from the second component. Upon tightening of the attachment element, the intermediate region of the mounting device is brought into contact with the second component by elastic or plastic deformation of the mounting device, whereby the position of the first component is fixed in relation to the second component.

The inventive mounting assembly can be produced very easily, e.g., deep-drawing or by punching and bending. In addition, a variety of manufacturing tolerances within a predetermined tolerance range can be accepted when the mounting assembly is produced. By choosing a particular contour for the mounting device and an acceptable tolerance range during production of the mounting device, it is possible for the mounting device to be pressed against the component on which the mounting device is installed when the attachment element is tightened to cause an elastic and/or plastic deformation of the mounting device. If the second component on which the mounting device is installed by means of the attachment element has an even surface, the surface of the mounting device facing towards the second component is designed to be concave. If the mounting device is made of a synthetic material, for example, this contour of the surface of the mounting device can be produced using an injection mold apparatus.

In a further development, the mounting device is provided with a raised area that comes into contact with the attachment element on the surface away from the second component. This arrangement has the advantage that when the attachment element is tightened, the pressure exerted by the attachment element on the surface of the mounting device or on the raised area is transmitted uniformly to the intermediate region of the mounting device.

In another further development of the mounting device, the raised area is deformable by the attachment element. The raised area is thereby able to adapt to the contour of the attachment element when it is tightened. Thus, commercially available attachment elements such as screws can be used. Furthermore, the adaptation of the raised area to the contour of the attachment element results in an even distribution of force from the surface of the attachment element to the raised area. In this configuration, the attachment element is less likely to become spontaneously undone.

BRIEF DESCRIPTION OF THE DRAWINGS

The invention is described in greater detail through the embodiments shown in the drawings, wherein.

DETAILED DESCRIPTION OF THE INVENTION

The same reference numbers are used for corresponding parts in FIGS. 1, 2, 3 and 4.

Figure 1:
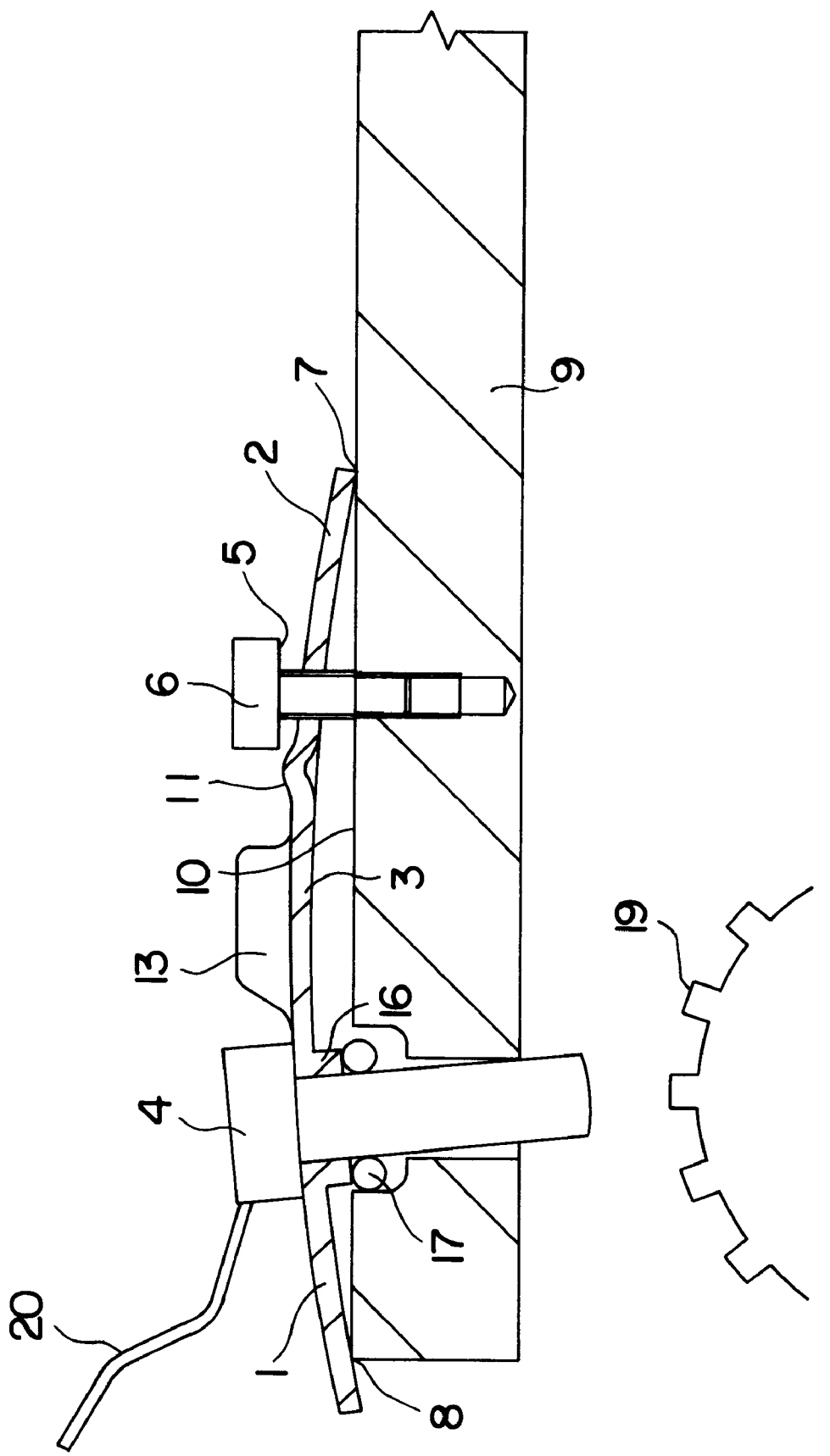
FIG. 1 shows a sectional side view of the inventive mounting assembly before tightening of the attachment element.

FIG. 1 shows a first component (4) in the form of a wheel speed sensor, a mounting device (1, 2, 3), a second component (9), and an attachment element (6) which connects the mounting device (1, 2, 3) to the second component (9). In this embodiment, the second component (9) constitutes a part of the wheel suspension of a vehicle. The attachment element (6) may be a screw which can be screwed into threads cut in the second component (9). A nut which is screwed on a threaded stud connected to the second component (9) can also be used as the attachment element (6). In an alternative embodiment, the attachment element (6) is a clamp that clamps the mounting device (1, 2, 3) to the second component (9).

The mounting device (1, 2, 3) has a first region (1) in which the sensor (4) is located, and a second region (2) in which at least part of the surface of the mounting device (1, 2, 3) comes into contact with an attachment surface (5) of the attachment element (6). The mounting device (1, 2, 3) also has an intermediate region (3) located between the first (1) and second (2) regions.

The sensor (4) is soldered to the mounting device (1, 2, 3) in the first region (1). The sensor (4) can also be connected to the mounting device (1, 2, 3) by other methods, such as screwing, bonding or welding. It is also possible for the sensor (4) and the mounting device (1, 2, 3) to be constructed as a single unit.

The sensor (4) is provided with an electrical connection cable (20) which connects the sensor (4) to a signal evaluation circuit (not shown). The sensor (4) is magnetically associated to the toothed sensor wheel (19).

A positioning element (16) for a seal (17), which fits closely to the part of the sensor (4) that faces towards the toothed sensor wheel (19), is located in the first region (1) of the mounting device (1, 2, 3). The positioning element (16) and the mounting device (1, 2, 3) are constructed as a single unit. When attaching the mounting device (1, 2, 3) to the second component (9), the positioning element (16) causes the seal (17) to be positioned at a predetermined distance from the surface (10) of the second component (9).

The positioning element (16) is in the form of a beam which permits the centering of the sensor (4) in relation to a passage opening in the second component (9). In addition, the beam shaped positioning element (16) lends rigidity to the first region (1) of the mounting device (1, 2, 3).

A raised area or boss (11) is provided in the second region (2) of the mounting device (1, 2, 3) and is covered in part by the attachment surface (5) of the attachment element (6). The raised area (11) extends at an angle to the upper surface of the mounting device (1, 2, 3) away from the second component (9) and starting from the second region (2) rises in the direction of the intermediate region (3) towards the attachment surface (5) of the attachment element (6). When the attachment element (6) is tightened, the part of the attachment surface (5) facing towards the intermediate region (3) first comes into contact with the raised area (11). The raised area (11) is preferably produced by embossing.

Figure 2:
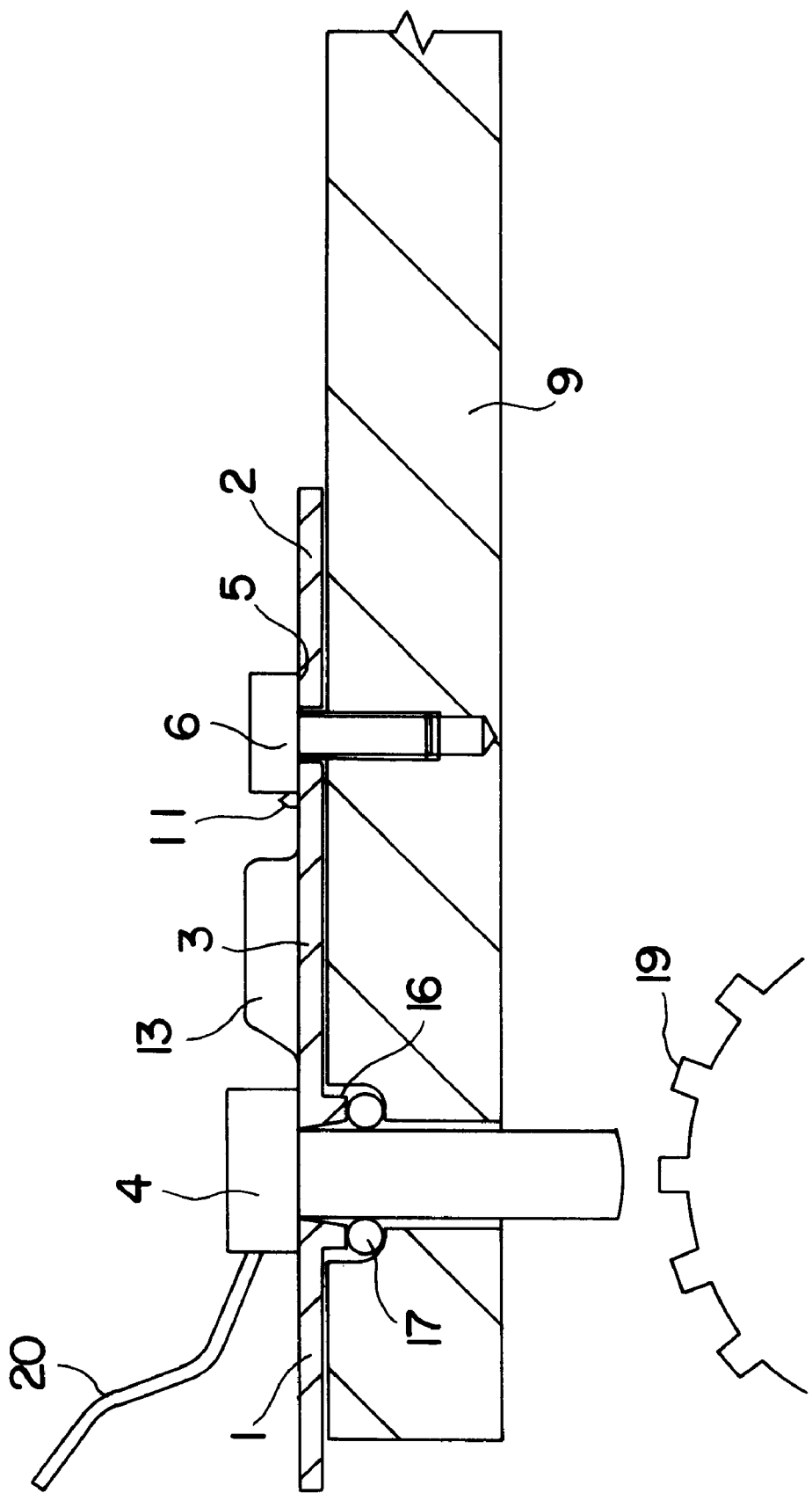
FIG. 2 shows the mounting assembly of FIG. 1 after tightening of the attachment element.

In the arrangement shown in FIG. 1, the attachment element (6) is shown in an untightened state and therefore the attachment surface (5) of the attachment element (6) is not yet pressed against the raised area (11). In this state, part (7) of the second region (2) and part (8) of the first region (1) of the mounting device are in contact with the surface (10) of the second component (9). In this arrangement, the intermediate region (3) is not yet brought into contact with the surface (10) of the second component (9). By tightening the attachment element (6), the attachment surface (5) is first brought into contact with the raised area (11). Additional tightening of the attachment element (6) deforms the mounting device (1, 2, 3) until the surface of mounting device (5) facing towards the second component (9) is pressed against surface (10). In this process, the raised area (11) is deformed by the pressure of the attachment surface (5) and is thereby molded to the contour of the attachment surface (5). FIG. 2 shows the arrangement described above in its final assembled state, following the tightening of the attachment element (6).

In the example shown, the surface (10) of the second component (9) is flat and the surface of the mounting device (1, 2, 3) facing towards the second component (9) is concave. If the surface (10) of this second component (9) is concave, the surface of the mounting device (1, 2, 3) facing towards the second component (9) could be flat. In general, for the configuration of the surfaces facing each other, the rule is that the concave surface is curved more than the flat or convex surface. When the two surfaces are concave, their curvature depends only on the tolerance which is to be compensated for by the deformation of the mounting device (1, 2, 3).

Figure 3:
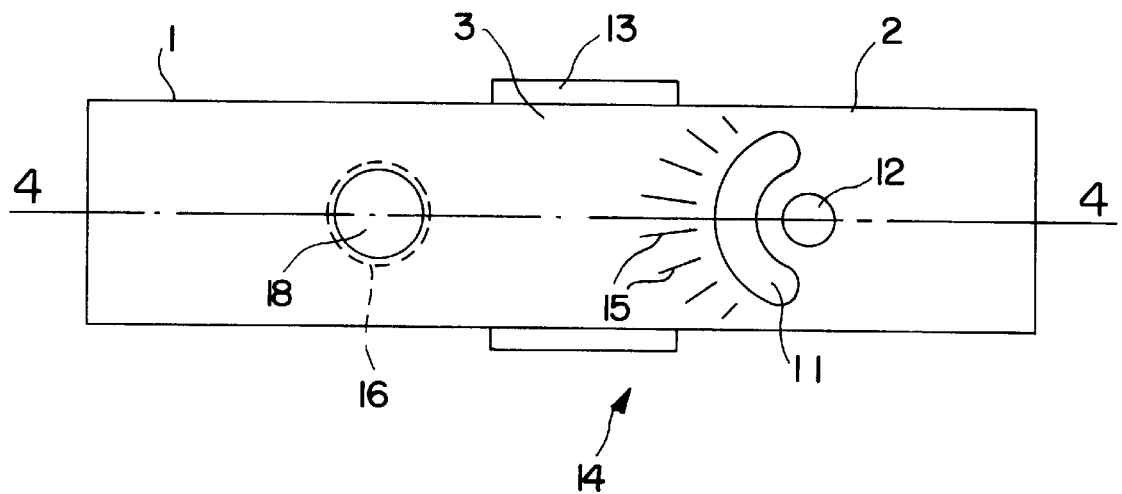
FIG. 3 shows a top view of another embodiment of the mounting assembly.
Figure 4:
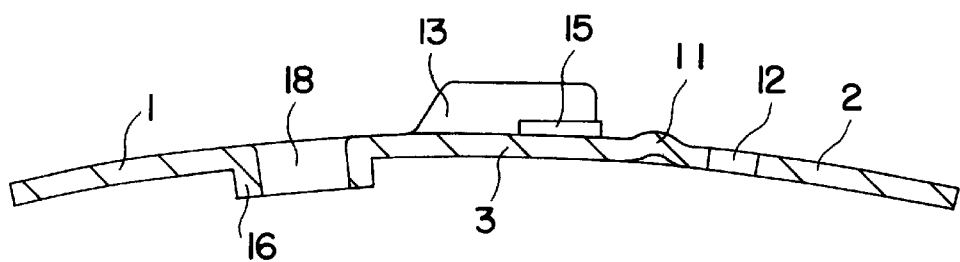
FIG. 4 shows a sectional side view of the mounting assembly of FIG. 3.

FIGS. 3 and 4 show two views of another embodiment of the mounting device according to the invention. In addition to the characteristics already described, the mounting device (1, 2, 3) shown in FIGS. 3 and 4 is provided with stiffening means (13, 14), a receiving opening (18) for the sensor (4), a receiving opening (12) for the attachment element (6), and stiffening ribs (15) surrounding the receiving opening (12) at least in part and extending in the radial direction towards the first region (1).

The stiffening means (13, 14) serve to stiffen the mounting device (1, 2, 3) in the longitudinal direction. This stiffening makes it possible for axial movements of the sensor caused by vibrations of the second component (9) to be reduced.

In particular, when mounting devices according to the invention are made of thin material, an improved force transmission from the attachment element (6) via the raised area (11) to the intermediate region (3) of the mounting device is achieved through the stiffening ribs (15). The mounting device is preferably made of a thin sheet metal, e.g., steel metal, and is deep-drawn.

When the mounting device is made of a synthetic material, a metal insert is inserted in the second region (2) of the mounting device as a contact surface for the attachment surface (5) of the attachment element (6). The insert can replace the raised area (11) in such an embodiment. When the attachment element (6) is tightened, the synthetic material below the insert is deformed instead of the raised area (11). An alternative to having an insert is to use a special embodiment of the attachment element (6) having a stop, e.g., a step, which can be brought into contact with the second component (9).

It is also possible to make the mounting device (1, 2, 3) and the first component (4) as one unit by means of a plastic pressing process or a deep-drawing process.

Finally, the above-discussion is intended to be merely illustrative of the invention. Numerous alternative embodiments may be devised by those having ordinary skill in the art without departing from the spirit and scope of the following claims.

I claim:

1. A mounting assembly, comprising:
    a mounting device having first and second regions, and an intermediate region located between said first and second regions,
    a sensor mounted on said first region of said mounting device,
    an attachment element for adjustably connecting said second region of said mounting device to a surface of a second component,
    said intermediate region of said mounting device configured to be spaced away from the surface of the second component,
    said mounting device being configured so that upon tightening of said attachment element, said intermediate region of said mounting device is brought into contact with the surface of the second component by deformation of said mounting device, and the position of said sensor can be adjusted in relation to the second component.

2. The mounting assembly of claim 1 further comprising a raised area in said second region of said mounting device, said raised area being on a surface of said mounting device which is configured to face away from the second component and at a location which comes into contact with said attachment element when said attachment element is tightened.

3. The mounting assembly of claim 2 wherein said raised area extends at an angle to a surface of the mounting device which is configured to face away from said second component, and wherein said raised area begins rising at said second region of said mounting device in the direction of said intermediate region towards an attachment surface of said attachment element.

4. The mounting assembly of claim 2 wherein said raised area is deformed by tightening of said attachment element.

5. The mounting assembly of claim 2 wherein at least a portion of said raised area lies beneath an attachment surface of said attachment element.

6. The mounting assembly of claim 2 wherein said second region includes a receiving opening for receiving said attachment element therein.

7. The mounting assembly of claim 6 wherein said raised area surrounds said receiving opening at least in part.

8. The mounting assembly of claim 2 wherein said raised area is produced by embossing.

9. The mounting assembly of claim 1 further comprising at least one stiffening element in contact with said mounting device to provide stiffness in a longitudinal direction of said mounting device.

10. The mounting assembly of claim 1 further comprising stiffening ribs in said mounting device which surround a receiving opening for said attachment element at least in part, said stiffening ribs extending radially away from the receiving opening in the direction of said first region.

11. The mounting assembly of claim 1 further comprising a positioning element located in said first region of said mounting device, said positioning element being configured to position a seal, said positioning element being unitary, in structure with said mounting device.

12. The mounting assembly of claim 1 wherein said mounting device comprises a thin, deep-drawn material.

13. The mounting assembly of claim 1 wherein said mounting device is made from a metallic or a synthetic material.

14. The mounting assembly of claim 1 further comprising a receiving opening in said first region of said mounting device for receiving said sensor.

15. The mounting assembly of claim 1 wherein said sensor is unitary with said mounting device.

16. The mounting assembly of claim 1 wherein the sensor is a wheel speed sensor.

17. The mounting assembly of claim 1 wherein said mounting device is curved, and wherein said intermediate region of said mounting device is configured to be brought into contact with a flat surface of the second component upon tightening of said attachment element.

* * * * *